US012809986B2

(12) United States Patent
Heidenreich

(10) Patent No.: US 12,809,986 B2
(45) Date of Patent: Nov. 24, 2026

(54) SCRIPTING TRANSFORM LOADER

(71) Applicant: Wells Fargo Bank, N.A., San Francisco, CA (US)

(72) Inventor: Laura Diane Heidenreich, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 369 days.

(21) Appl. No.: 18/394,241

(22) Filed: Dec. 22, 2023

(65) Prior Publication Data

US 2025/0209177 A1 Jun. 26, 2025

(51) Int. Cl.
*G06F 21/57* (2013.01)
*G06F 21/53* (2013.01)
*G06F 40/205* (2020.01)

(52) U.S. Cl.
CPC ............ *G06F 21/577* (2013.01); *G06F 21/53* (2013.01); *G06F 40/205* (2020.01)

(58) Field of Classification Search
CPC .... G06F 21/577; G06F 21/53; G06F 21/6254; G06F 40/205
See application file for complete search history.

(56) References Cited

U.S. PATENT DOCUMENTS 7,533,118 B2 5/2009 Chaudri
8,463,667 B2 6/2013 Stine et al.
9,792,387 B2 10/2017 George et al.
9,843,625 B2 12/2017 Pillai et al.
10,699,071 B2 6/2020 Isaacson
11,366,858 B2 6/2022 Atallah
2004/0255275 A1* 12/2004 Czerwonka ......... G06F 11/3684 717/124
2006/0112123 A1 5/2006 Clark et al.
2016/0335383 A1* 11/2016 Yao ........................ G06F 30/347
2016/0371238 A1* 12/2016 Heavenrich ........... G06F 40/186
2020/0250370 A1* 8/2020 Marc-Aurele ........ G06F 40/295
2021/0004383 A1 1/2021 Venkatasubramanian et al.
2021/0056259 A1* 2/2021 Hegde ...................... H04L 67/52
2022/0019624 A1 1/2022 Gwozdz et al.
2023/0359771 A1* 11/2023 Luo ...................... G06F 21/6227
2023/0385298 A1* 11/2023 Razin ................. G06V 30/1444

OTHER PUBLICATIONS

Koehler, Martin, “Incorporating Data Context to Cost-Effectively Automate End-to-End Data Wrangling”, IEEE Transactions on Big Data (vol. 7, Issue: 1, Mar. 1, 2021), pp. 169-186, DOI: 10.1109TBDATA.2019.2907588, (Mar. 1, 2021), 19 pgs.

* cited by examiner

*Primary Examiner* — Trong H Nguyen
(74) *Attorney, Agent, or Firm* — SCHWEGMAN LUNDBERG & WOESSNER, P.A.

(57) ABSTRACT

Systems, methods, and techniques enable scalable on-demand data transformations while minimizing security vulnerabilities. Sample data is received, and a set of data field types of the sample data are identified. A user interface (UI) is caused for presentation on a display of a first device to enable the user of the first device to create a custom mapping between a set of normalized data field types and the identified set of data field types. The custom mapping comprises a plurality of configurations, each configuration of the plurality of configurations includes configuration syntax from a set of predefined configuration syntax. The custom mapping is stored as a template.

18 Claims, 9 Drawing Sheets

SCRIPTING TRANSFORM LOADER

BACKGROUND

Enterprises need to import data in various formats and perform various transformation operations to manipulate the data. Data manipulations are generally performed by custom programming or the use of templates with customized programming functionality, for example, extract-transform-load (ETL) packages. Security is an important consideration in data manipulation. Conventional packages for data manipulation go through a systems development life cycle (SDLC) process to achieve security and stability goals for each data manipulation process. Standard SDLC processes include at least the steps of defining, designing, developing, testing, and deploying the software, each of which can be time-consuming. Accordingly, reasonably achieving the SDLC objectives prevents developing data manipulation solutions at a scalable level.

Some enterprises make use of a front-end client for on-demand data manipulations. The front-end approach makes use of code injection into existing systems with dynamic compiling and execution processing. However, the code injection is an intentional omission of several key steps of the SDLC process, such as peer review, testing, final security review before deploying, etc. Accordingly, front-end code injection for data manipulation exposes the application to several security vulnerabilities because the solution itself enables unchecked software development. For example, code injection is known to create vulnerabilities such as denial of service, arbitrary code execution, compromised (zombie) server, among other vulnerabilities. More flexible and secure systems and methods for data manipulation are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The systems, methods, and techniques described herein may be used to enable scalable data transformation using customization while mitigating vulnerabilities. For example, the techniques include a workflow engine for generating custom templates, which includes pre-defined options, each of which are reviewed through the SDLC. Configuration of a custom template can be completed by a user in minutes, according to some examples, and achieve required service level agreements (SLAs) without introducing additional risk.

For example, in many lines of business, data is received in a plurality of different formats. The plurality of formats can each be transformed into a normalized data format, for example, using a template. In some examples, data may be received from multiple geographic regions (e.g., counties, provinces, parishes, municipalities), each of which has their own standard data arrangements and values. Accordingly, a different template may be necessary to convert data from each respective different format (e.g., each respective county) into the normalized format. Conventionally, developing each template requires a lengthy SDLC review process, which can take weeks or longer, or, accepting security vulnerabilities as a trade-off for circumventing the SDLC processes.

Systems, methods, and techniques described herein use a scripting process in conjunction with existing template-creation flows to enable scalable and on-demand creation of customized templates. Further, the systems, methods, and techniques described herein enable a user to manipulate data in unknown formats. For example, for a particular non-standardized data format, the user provides sample data to the system. The system uses the sample data to identify a set of data field types within the data. The system enables the user to configure customized mappings between the identified set of data field types and a given normalized set of data field types. The system limits the types of configuration syntax available to the user to a predefined set that has been through the SDLC process, for example, with a custom scripting language. The system stores the customized mapping as a template. Accordingly, the user is able to configure a customized data transformation template on-demand (e.g., within minutes) without introducing unnecessary risk to the system.

The scripting process used to create customized templates does not require use a compiler, according to some examples. Conventional templating solutions require dynamic code compiling, which further requires a compiler to be available within the templating application. The scripting process presented herein use an interpreter rather than a compiler to read the configuration syntax at runtime. Accordingly, solutions presented herein are more lightweight than conventional solutions.

Figure 1:
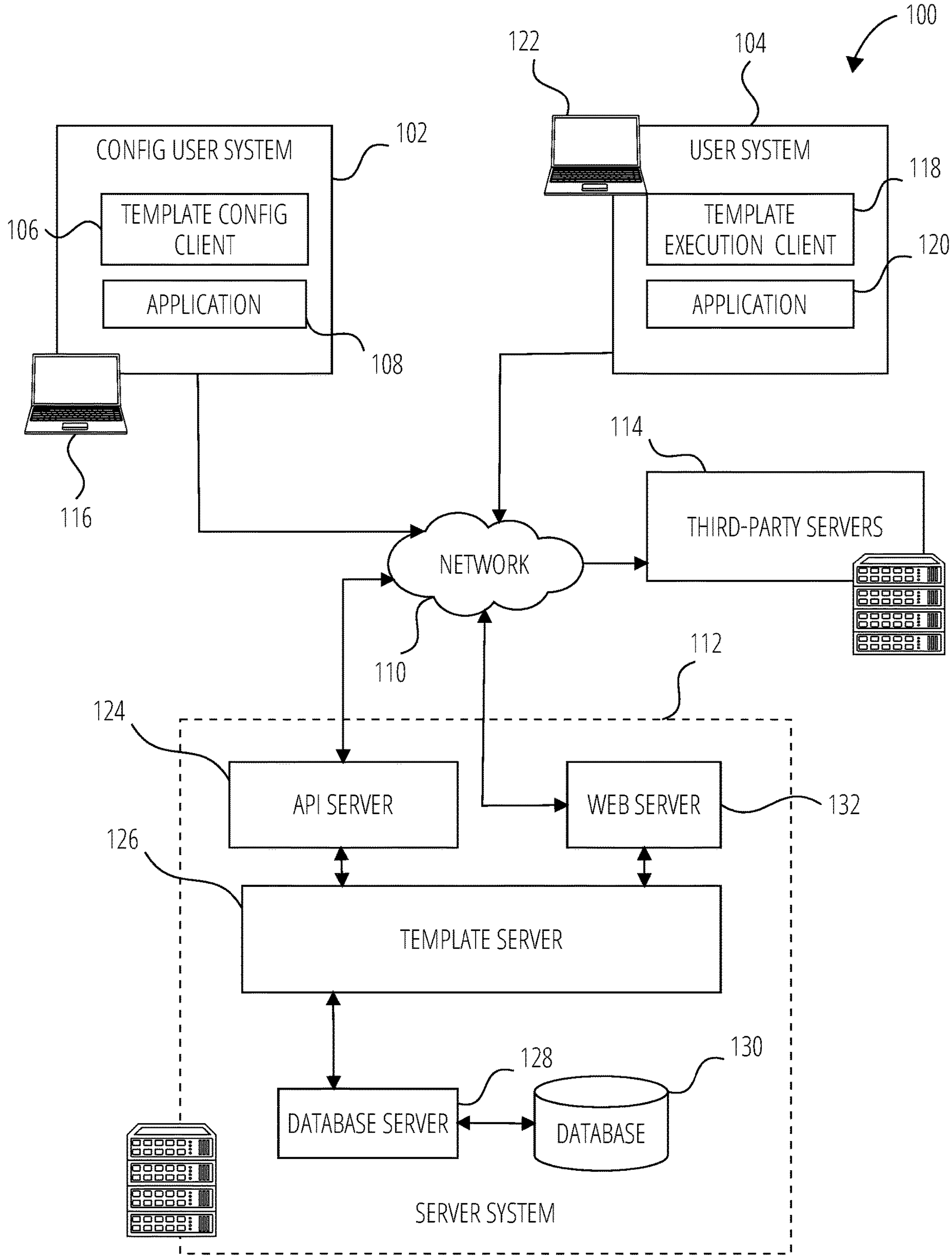
FIG. 1 is a diagrammatic representation of a networked environment in which the present disclosure may be deployed, according to some examples.

FIG. 1 is a diagrammatic representation of a networked environment in which the present disclosure may be deployed, according to some examples. FIG. 1 includes a block diagram showing an example system 100 for enabling data transformation over a network. The system 100 includes at least one configuration user system 102 and an example user system 104. According to some examples, each of the configuration user system 102 and user system 104 are each communicatively coupled, via one or more communication networks including a network 110 (e.g., the Internet), to a server system 112 and, optionally, third-party servers 114.

The configuration user system 102 hosts at least a template configuration client 106. According to some examples, the configuration user system 102 hosts multiple applications, including a template configuration client 106 and other applications 108. According to some examples, the other applications 108 are managed by a different party than the configuration client 106 (e.g., the other applications 108 can be managed by third party servers 114). The configuration user system 102 includes one or more user devices, such as a computer device 116, that are communicatively connected to exchange data (e.g., via the network 110). The template configuration client 106 can communicate with locally hosted applications 108 using Applications Program Interfaces (APIs) and can communicate with the network 110 via the configuration user system 102.

The user system 104 hosts multiple applications, including a template execution client 118 and other applications 120. The user system 104 includes one or more user devices, such as a computer device 122, that are communicatively connected to exchange data (e.g., via the network 110). The template execution client 118 can communicate with locally hosted applications 120 using APIs and can communicate with the network 110 via the user system 104.

the user system 104 interacts with the server system 112 via the network 110. A configuration user system 102 interacts with the server system 112 and, optionally, with user systems 104. The data exchanged between the user systems 104, between the configuration user system 102 and user systems 104, between the configuration user system 102 and the server system 112, and between the user systems 104 and the server system 112 includes functions (e.g., commands to invoke functions) and payload data (e.g., text, audio, video, or other multimedia data).

The server system 112 provides server-side functionality via the network 110 to the configuration user system 102 and user systems 104. While certain functions of the system 100 are described herein as being performed by either a template configuration client 106, a template execution client 118, or by the server system 112, the location of certain functionality either within the template configuration client 106, the template execution client 118, or the server system 112 may be a design choice. For example, it may be technically preferable to initially deploy particular technology and functionality within the server system 112 but to later migrate this technology and functionality to the template execution client 118 where a user system 104 has sufficient processing capacity.

The server system 112 supports various services and operations that are provided to the configuration user system 102 or the user systems 104. Such operations include transmitting data to, receiving data from, and processing data generated by the configuration user system 102 or the user systems 104. This data may include message content, device information, geolocation information, passwords and user information, among other information. Data exchanges within the system 100 are invoked and controlled through functions available via user interfaces (UIs) of the configuration user system 102 and user system 104 (e.g., computer device 116 and computer device 122, respectively).

Turning now specifically to the server system 112, an Application Program Interface (API) server 124 is connected to and provides programmatic interfaces to template server 126 making the functions of the template server 126 accessible to template configuration clients 106, template execution clients 118, other applications 108, other applications 120, and third-party servers 114. The template server 126 is communicatively coupled to a database server 128, facilitating access to a database 130 that stores data associated with templates processed by the template server 126. Similarly, a web server 132 is coupled to the template server 126 and provides web-based interfaces to the template server 126. To this end, the web server 132 processes incoming network requests over the Hypertext Transfer Protocol (HTTP) and several other related protocols. In some examples, any combination of the database server 128, the database 130, the template server 126, the API server 124, the web server 132 are on a single server or within a single housing.

The API server 124 receives and transmits data between the template server 126 and the configuration user system 102 (for example, template configuration client 106 and other applications 108) and the user system 104 (for example, template execution client 118 and other applications 120) and the third-party servers 114. Specifically, the API server 124 provides a set of interfaces (e.g., routines and protocols) that can be called or queried by the template configuration client 106, template execution client 118, and other applications 108/applications 120 to invoke functionality of the template server 126. The API server 124 exposes various functions supported by the template server 126, including account registration; login functionality; the sending of template data, via the template server 126, from a particular user system 104 to another user system 104; the communication of files (e.g., template data, sample data) from the configuration user system 102 to the template server 126; the settings of a collection of template options; the retrieval of templates or other data; the addition and deletion of templates; among other data exchanges described herein.

The template configuration client 106 and template execution client 118 host multiple systems and subsystems, described below with reference to FIG. 2 and FIG. 3, respectively.

Figure 2:
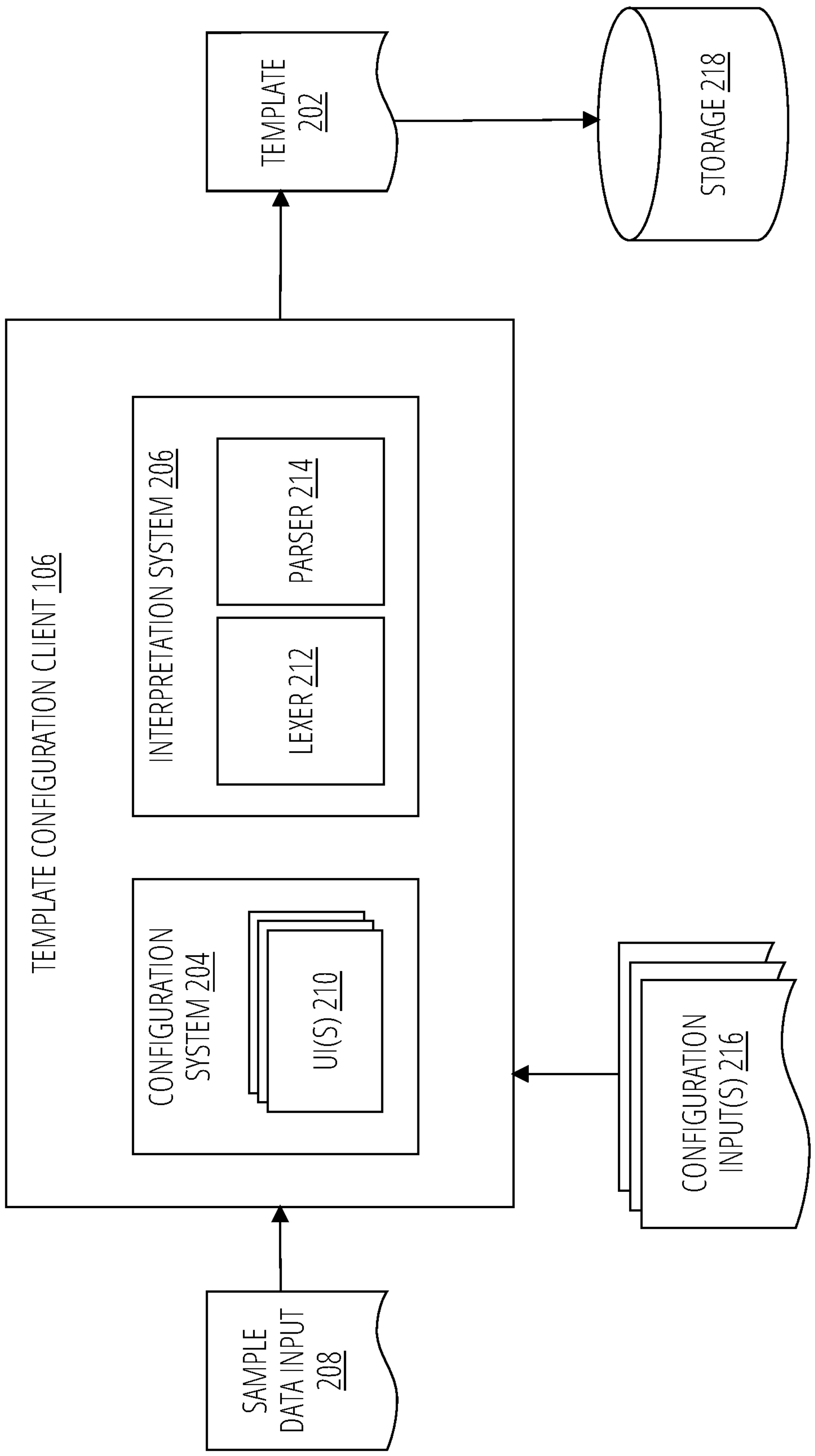
FIG. 2 is a diagrammatic representation of a template creation client, according to some examples.

FIG. 2 is a diagrammatic representation of the template configuration client 106, according to some examples. The template configuration client 106 enables a user, such as the user of the configuration user system 102, to create a customized template 202 of data transformations. The template configuration client 106 includes a configuration system 204 and an interpretation system 206, according to some examples. The template configuration client 106 may have additional or fewer sub-systems in some examples, and the organization of certain functionality either within the configuration system 204 or interpretation system 206 may be a design choice. Other organizations of the functionality described herein are possible.

The template configuration client 106 receives sample data input 208, according to some examples. The sample data input 208 is data that has been input by a user of a device, such as the configuration user system 102, or data obtained automatically. According to some examples, the sample data input 208 has a plurality of data elements, where each data element of the plurality of data elements belongs to a data field type. The data elements are individual instances data within the sample data input 208, according to some examples. The data field types are categorical classifications of the data elements. For example, the data field types may be as broad as native data types, such as string, integer, float, char, binary, among others. Additionally, or alternatively, the data field types can include variables, such as global variables, local variables, static local variables, which may in turn be objects, functions (e.g., first class functions), or any other expression that represents a value. Additionally, or alternatively, the data field types represent more specific categorical classifications, such as column headers, or other titles for a subset of the data elements of the sample data input 208, according to some examples. The sample data input 208 can be relational, semi-structured, or unstructured data, according to some examples. The data field types may be unknown before the template 202 is generated.

For example, the sample data input 208 includes a plurality of string data elements, each belonging to a string data field type. As a further example, the sample data input 208 includes string data elements "54" and "Main St," where "54" belongs to a string data field type of "street_number" and "Main St" belongs to a string data field type of "street_name." According to some examples, the sample data input 208 is in the form of a string, where the data elements are substrings of the string.

The configuration system 204 enables configuration of a custom template by the user, according to some examples. In some examples, the configuration system 204 enables the user to provide one or more inputs to the template configuration client 106. According to some examples, the configuration system 204 causes presentation of one or more UIs 210 on a display of a user device of the user to enable user input. In some examples, the UIs 210 are stored locally by the configuration system 204, such as in a local memory of the configuration user system 102. In some examples, the UIs 210 are stored remotely (e.g., database 130) and are received by the template configuration client 106 over the network 110 upon query. In some examples, responsive to receiving a user input via the UIs 210, a template is stored by the template server 126 (e.g., database 130). According to some examples, the configuration system 204 generates the UIs 210 based on data received from the template server 126.

The interpretation system 206 interprets inputs provided to the template configuration client 106, according to some examples. In some examples, the interpretation system 206 processes input provided by the user via the configuration system 204. According to some examples, the interpretation system 206 includes a lexer 212 and a parser 214. The lexer 212 processes a sequence of characters as an input and outputs a tokenized version of the sequence of characters. The parser 214 builds a data structure of the tokenized sequence of characters. Additionally, or alternatively, the parser 214 checks the tokenized sequence of characters for correct syntax according to given syntax rules. The interpretation system 206 may have additional or fewer subsystems, according to some examples.

The configuration system 204 and interpretation system 206 operate in conjunction with one another to enable the user to create a customized template 202 of data transformations. For example, the configuration system 204 causes presentation of a UI 210 to enable user input of the sample data input 208, referred to as a data input UI herein, according to some examples. For example, the data input UI includes at least a field for a user to provide the sample data input 208. An example data input UI is discussed in relation to FIG. 5A.

The template configuration client 106, and more specifically, the interpretation system 206, processes the sample data input 208 to identify a set of data field types within the sample data input 208, according to some examples. In some examples, the sample data input 208 is a string or file in a delimiter-separated format (e.g., CSV, JSON, or other spreadsheet or database format types). The respective file is converted to a string and processed by the lexer 212 and parser 214, according to some examples. The lexer 212 tokenizes the string and the parser 214 identifies column headers and variables as the set of data field types, according to some examples. According to some examples, the parsing of the sample data input 208 is performed by an alternate subsystem of the template configuration client 106 or the template server 126.

Additionally, or alternatively, the configuration system 204 causes presentation of a UI 210 to enable user review of identified data field types, referred to as the identification review UI herein, according to some examples. For example, the identification review UI presents a display of the set of data field types identified by the template configuration client 106 in the sample data input 208. According to some examples, the user can modify the identified data field types by providing one or more inputs to the identification review UI. An example of the identification review UI is discussed further in relation to FIG. 5B.

Additionally, or alternatively, the configuration system 204 causes presentation of at least one UI 210 to enable the user to create a custom mapping between a given set of normalized data field types and the identified set of data field types, referred to as configuration UI(s) herein, according to some examples. In some examples, the configuration UI includes a column of the given normalized data field types, each row mapped to a respective configuration. Each configuration can include one or more data transformations of at least one identified data field type, according to some examples. That is, each configuration maps how to convert from at least one identified data field type to the respective normalized data field type. Example configuration UIs are discussed further in relation to FIG. 5C and FIG. 5D.

According to some examples, the configuration UI includes at least one input field for the user to provide configuration input 216 for each respective normalized data field type. The configuration input 216 is a user input that includes one or more data transformations of at least one identified data field type, according to some examples. The one or more data transformations convert the at least one identified data field type into the respective normalized data field type, according to some examples. According to some examples, each configuration input 216 is a string.

According to some examples, each of the one or more data transformations in the configuration input 216 belong to a set of predefined configuration syntax having been through the SDLC process. The set of predefined configuration syntax are known to be free from vulnerabilities since each predefined configuration syntax has been tested through the SDLC process. That is, each predefined configuration syntax has been securely designed, peer reviewed, tested, approved, and deployed, according to some examples. Additionally, or alternatively, the configuration syntax is scanned for security vulnerabilities, for example, by automated security tools. Thereby, the user can build the custom mapping with a customized combination of vulnerability-free predefined syntax.

According to some further examples, the set of predefined configuration syntax belongs to a custom scripting language. That is, the predefined configuration syntax is preapproved in the custom scripting language while all other syntax is disregarded by the interpreter (e.g., interpretation system 206, interpretation system 306) at runtime. For example, limiting the syntax prevents code injection attacks. The custom scripting language works to effectively sandbox the configurations from other processes.

According to some examples, the template configuration client 106 receives a plurality of configuration inputs 216. According to some examples, the template configuration client 106 receives the plurality of configuration inputs 216 at once (e.g., a batch of configuration inputs 216). According to some examples, the template configuration client 106 receives each configuration input 216 individually (e.g., in individual http requests).

The interpretation system 206 receives each configuration input 216 and processes it, according to some examples. In particular, the interpretation system 206 enforces the limitations on the configuration inputs 216. That is, the interpretation system 206 ensures each configuration input 216 adheres to the predefined configuration syntax, according to some examples.

According to some examples, the lexer 212 tokenizes the configuration input 216 and the parser 214 enforces the predefined configuration syntax. Any parsed syntax in the configuration input 216 that does not belong to the set of predefined configuration syntax triggers the interpretation system 206 to reject the configuration input 216. In some examples, the rejection takes the form of a popup UI 210 informing the user the input is invalid. The popup UI 210 may identify the invalid syntax, according to some examples. Rejected configuration input 216 is not saved to the custom mapping. The user may provide another configuration input 216 via the configuration UI.

In the event the configuration input 216 is valid (e.g., all syntax belongs to the set of predefined configuration syntax), the configuration input 216 is saved, according to some examples. In some examples where the predefined configuration syntax belongs to a custom scripting language, the interpretation system 206 maps the custom scripting language into another programming language before or at runtime (e.g., C#, C, JavaScript, Python, or other backend language, or machine code).

The user may repeat the steps described above any number of times to complete the custom mapping. According to some examples, the custom mapping is complete when each normalized data field type is associated with a valid configuration input 216. According to some examples, an input left empty by the user is a valid configuration input 216. The user can save the custom mapping as a template 202 via the configuration UI, according to some examples.

Additionally, or alternatively, the configuration system 204 causes presentation of at least one UI 210 to preview the template 202, referred to as a template preview UI herein, according to some examples. The template preview UI enables the user to review the template 202, and the underlying custom mapping, before publishing the template 202. The user can use the template review UI to modify the custom mapping, according to some examples. When satisfied with the template 202, the user can save or publish the template to storage 218.

The template 202 is a workflow with one or more data transformations, according to some examples. For example, the template 202 includes the custom mapping. According to some examples, the template 202 is an ETL workflow. The template 202 generated by the template configuration client 106 is stored in storage 218, according to some examples. In some examples, the storage 218 is local storage of the user's device (e.g., the configuration user system 102). According to some examples, the template configuration client 106 provides the template 202 to the server system 112 via the network 110, where it is stored by the template server 126 or in the database 130. According to some examples, the template configuration client 106 provides the template 202 to the third-party server 114 via the network 110.

According to some embodiments, the interpretation system 206 is a backend process on a server, such as the template server 126. In such embodiments, the template configuration client 106 communicates with the respective server to send and receive the requisite data for the interpretation system 206 to perform operations described herein. The location of the interpretation system 206 is a design choice.

Figure 3:
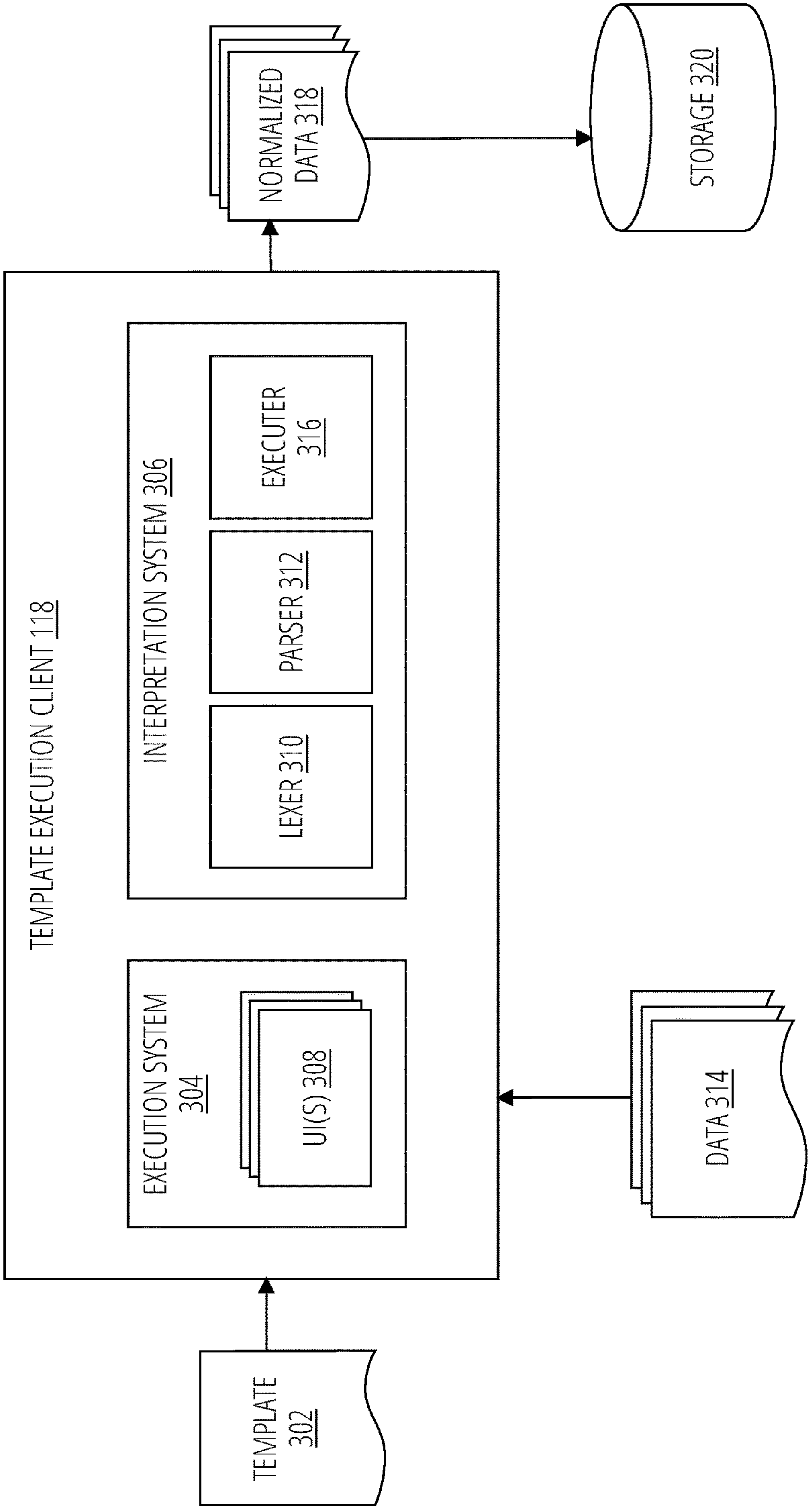
FIG. 3 is a diagrammatic representation of a template client, according to some examples.

FIG. 3 is a diagrammatic representation of the template execution client 118, according to some examples. The template execution client 118 enables a user, such as the user of the user system 104, to normalize data with a template 302. The template execution client 118 includes an execution system 304 and an interpretation system 306, according to some examples. The template execution client 118 may have additional or fewer sub-systems in some examples, and the organization of certain functionality either within the execution system 304 or interpretation system 306 may be a design choice. Other organizations of the functionality described herein are possible.

The execution system 304 enables execution of a template by the user, according to some examples. In some examples, the execution system 304 enables the user to request a template 302 for execution by the template execution client 118. According to some examples, the execution system 304 causes presentation of one or more UIs 308 on a display of a device of the user to enable execution of a template 302. In some examples, the UIs 308 are stored locally by the execution system 304, such as in a local memory of the user system 104. In some examples, the UIs 308 are stored by the template server 126 (e.g., database 130) and are received by the template execution client 118 over the network 110 upon query. According to some examples, the execution system 304 generates one or more UIs 308 based on data received from the template server 126. In some examples, the execution system 304 may use the template 302 to generate the one or more UIs 308 for display to the user.

The interpretation system 306, which can comprise an example of the interpretation system 206, includes a lexer 310, a parser 312, and an executer 316. The lexer 310 comprises an example of the lexer 212, according to some examples. The parser 312 comprises an example of the parser 214, according to some examples. The template 302 comprises an example of the template 202, according to some examples.

According to some examples, the execution system 304 causes presentation of a UI 308 to enable the user to request use of a template 302, referred to herein as the request UI 308, according to some examples. The execution system 304 receives one or more inputs from the user via the request UI 308 indicating the request, according to some examples. In some examples, the user provides one or more inputs identifying the template 302 (e.g., an identification number associated with the template 302). According to some examples, the execution system 304 determines which template to retrieve based on the one or more inputs and, optionally, data about the user. For example, the execution system 304 determines the template 302 based on an input identifying the county of real estate data to be processed. Additionally, or alternatively, the execution system 304 determines the template 302 based on the data about the user (e.g., job title, clearance level, membership of certain team(s), previously used templates, etc.).

Alternatively, the request UI 308 is not included. According to some examples, the execution system 304 determines the template 302 based on the data 314 received, without user input. In some examples, the execution system 304 uses metadata associated with the data 314 to determine the template 302 (e.g., metadata identifying the county of real estate data). Additionally, or alternatively, the execution system 304 processes the data 314 to identify the data type fields, and determines the template 302 that converts from the identified data field types to the normalized data field types, according to some examples. In some examples, the execution system 304 requests the template 302 from storage without user input.

According to some examples, the template execution client 118 forwards the request for the template 302 to the storage location of the template 302. In some examples, the template execution client 118 requests the template 302 from the server system 112 or third-party servers 114 via the network 110. In some examples, the template execution client 118 requests the template 302 from local storage of the user's device. The template execution client 118 received the template 302 from its respective storage location.

Additionally, or alternatively, the execution system 304 causes presentation of a UI to enable the user to execute the template 302, referred to as the template execution UI 308 herein, according to some examples. The template execution UI 308 enables the user to process data 314 with the template 302. According to some examples, the user uses the template execution UI 308 to query data 314 for normalization by the template 302. In some examples, the template execution UI 308 is not included.

According to some examples, the data 314 is of the same format as the respective sample data input 208 used to generate the template 302. That is, the template 302 is configured to normalize data received in a particular format. According to some examples, the data 314 is queried from local storage of the user's device. According to some examples, the data is queried over the network 110 from the server system 112 or the third-party servers 114.

Additionally, or alternatively, the data 314 is received without the user making a query. For example, the template execution client 118 receives the data 314 without the user providing input requesting the data 314. That is, another entity, such as the server system 112 or the third-party servers 114, automatically provide the data 314 to the template execution client 118, according to some examples. In some examples, receipt of the data 314 triggers the template execution client 118. For example, the request UI may launch responsive to receiving the data 314.

According to some examples, the data 314 is processed by the interpretation system 306. The processing of the data 314 may include the same examples and steps as the interpretation system 206 processing the sample data input 208, according to some examples. That is, the interpretation system 306 identifies a set of data field types of the data 314 and at least one data element of each data field type. According to some examples, the parser 312 of the interpretation system 306 parses the data 314 into rows. Further according to some examples, each row contains one data element of each identified data field type.

According to some examples, the interpretation system 306 processes the template 302 to prepare the template for execution. In some examples, processing the template involves mapping the syntax of the template 302 into a lower-level programming language (e.g., backend Prior to normalization, the data 314 is processed by the lexer 310 and the parser 312, according to some examples. The lexer 310 tokenizes the data 314. According to some examples, the lexer 310 receives the data 314 as an input string of characters. The lexer 310 converts the string of characters into tokens, where each token is a substring of the input string of characters with an assigned meaning. The lexer 310 provides the tokenized data 314 to the parser 312.

The parser 312 parses the tokenized data 314. According to some examples, the parser 312 parses the tokens of the tokenized data 314 into a data structure (sometimes referred to as a 'parse tree'). In some examples, the custom parser re-orders the tokens into the data structure based on precedence in order of operations using Reverse Polish notation. The parser 312 provides the data structure representing the lexed and parsed data 314 to the executer 316.

The executer 316 applies the processed data 314 to the template 302, according to some examples. That is, the executer 316 applies the data structure representing the data 314 to the template to generate the set of normalized data, according to some examples. The executer 316 outputs the normalized data 318, according to some examples. In other words, the executer 316 transforms the data structure into the normalized format, according to some examples.

According to some examples, the parser 312 parses each row of the data 314 separately. That is, the parser 312 generates a data structure of each row of the data 314. Further according to some examples, each parsed row of the data 314 is applied to the template 302 by the executer 316. In some examples, each configuration within the template 302 executes one or more data transformations on respective data elements in the parsed row of data 314 to generate the respective normalized data element, according to some examples.

The normalized data 318 is stored in storage 320, according to some examples. In some examples, the storage 320 is local storage of the user's device (e.g., the user system 104). According to some examples, the template execution client 118 provides the normalized data 318 to the server system 112 via the network 110, where it is stored in the database 130. According to some examples, the template execution client 118 provides the normalized data 318 to the third-party servers 114 via the network 110.

Figure 4:
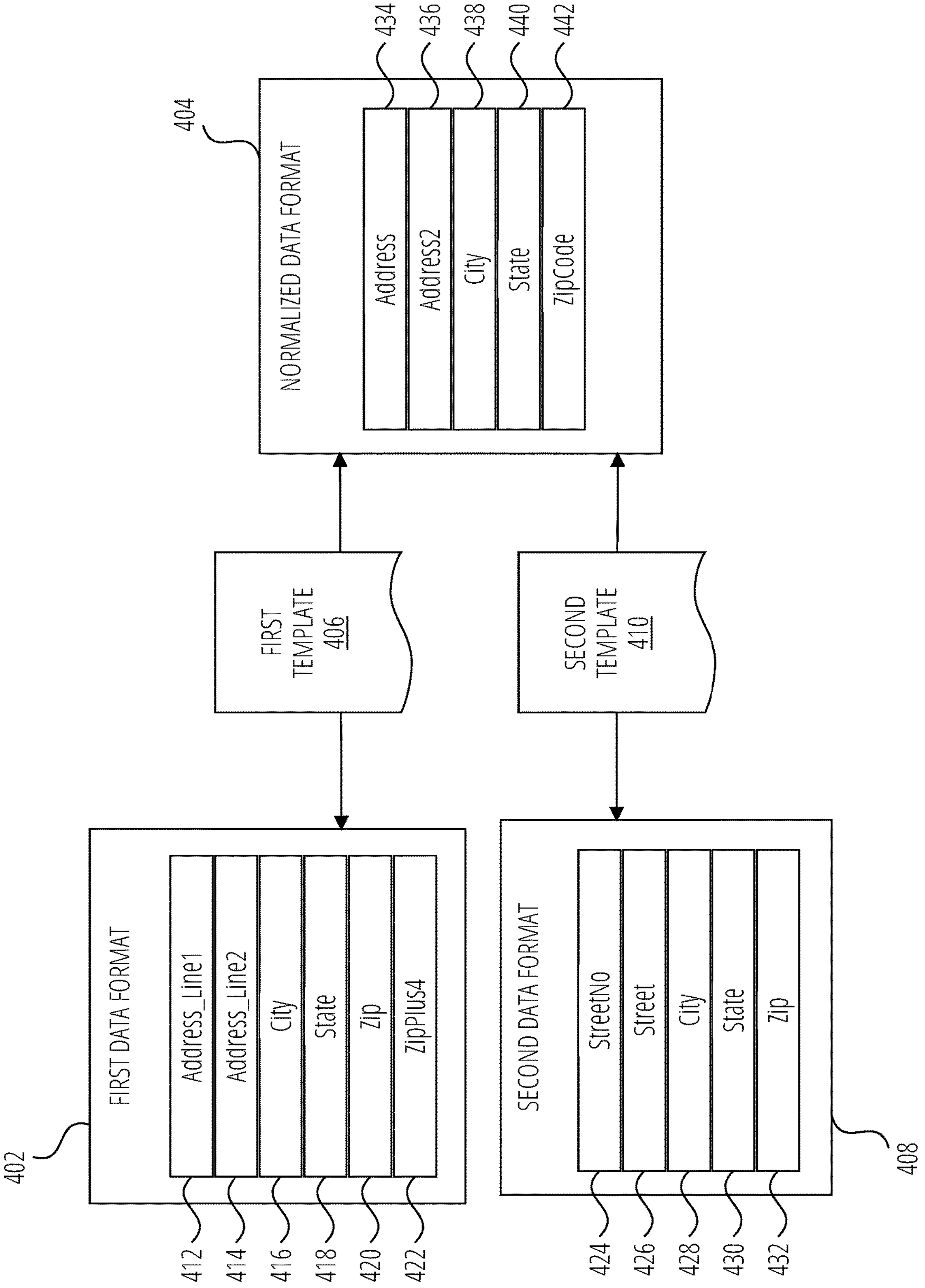
FIG. 4 illustrates example data transformations using templates, according to some examples.

FIG. 4 illustrates example data transformations using templates, according to some examples. For example, a first data format 402 is transformed into normalized data format 404 using a first template 406, and a second data format 408 is transformed into the normalized data format 404 using a second template 410.

In the illustrated example, publicly available real estate data from different locations is stored in different formats. Prior to further analysis of the real estate data, the real estate data has to be transformed into a normalized format for comparison and analysis. Within this example, the first data format 402 and the second data format 408 are disparate formats for address data. For example, the first data format 402 is associated with a first multiple listing service (MLS) of real estate, and the second data format 408 is associated with a second MLS. For example, the first data format 402 includes six data field types: Address_Line1 412, Address_Line2 414, City 416, State 418, Zip 420, and ZipPlus4 422. The second data format 408 includes five data field types: Street No 424, Street 426, City 428, State 430, and Zip 432. The particular data field types and number thereof are for illustrative purposes.

The first data format 402 and the second data format 408 both need to be converted into the normalized data format 404 for further analysis. The normalized data format 404 includes five data field types: Address 434, Address2 436, City 438, State 440, and ZipCode 442.

A user of the template configuration client 106 can create the custom first template 406 by providing sample data of the first data format 402 to the template configuration client 106. The template configuration client 106 identifies the set of six data field types in the first data format 402. The template configuration client 106 presents the user with a configuration UI to create a custom mapping between the five normalized data types and the six identified data field types. For example, in creating the custom mapping, for the normalized data field type of ZipCode 442, the user provides a configuration input of "return (Join(@Zip, "–", @ZipPlus4))." The configuration input indicates the data field types of Zip 420 and ZipPlus4 422 are joined with a dash to transform into the normalized data field type of ZipCode 442. Once the user has completed configuring the custom mapping, the user saves the custom mapping as the first template 406 in storage.

The user can repeat the same process to generate the second template 410 for the second data format 408.

The same user, or a different user, can query the first template 406 from storage to convert data of the first data format 402 to the normalized data format 404. Accordingly, any user compiling the real estate data can use the first template 406 to save time in data transformation without introducing security vulnerabilities.

Figure 5A:
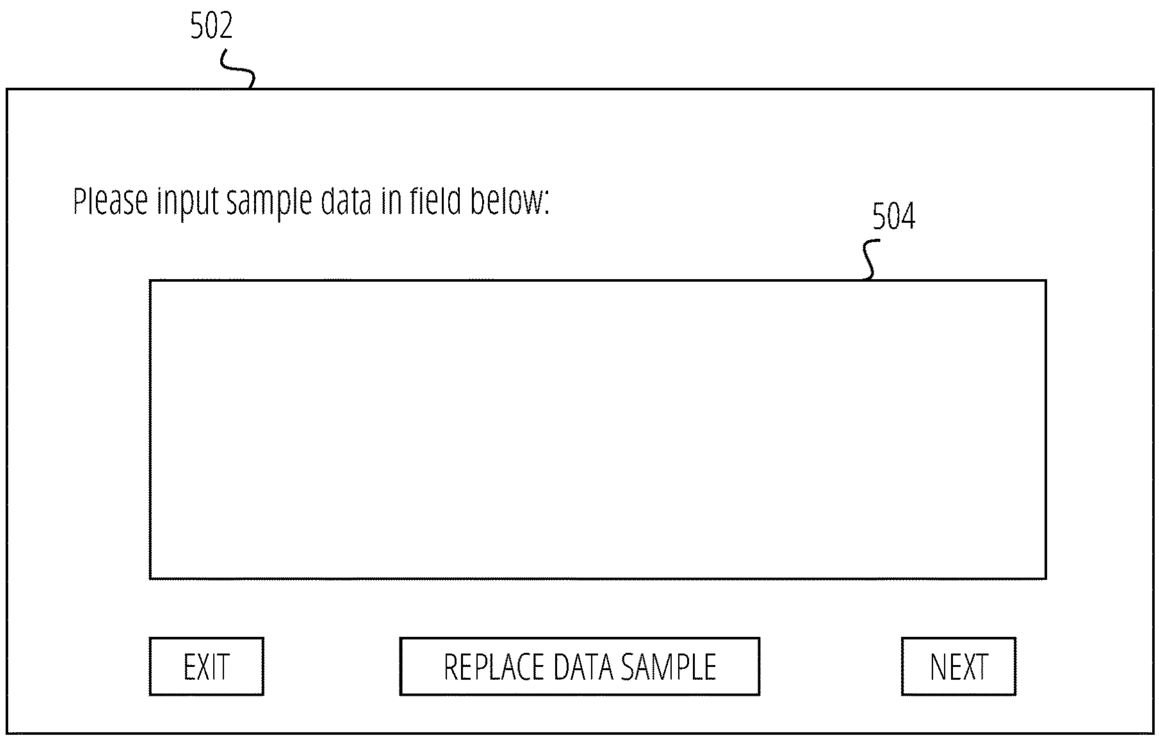
FIG. 5A illustrates an example data input user interface (UI), according to some examples.

FIG. 5A illustrates an example data input UI 502, according to some examples. The sample data input 208 includes at least a sample data input field 504, according to some examples. The sample data input field 504 is configured to receive sample data input from a user, such as the sample data input 208 of FIG. 2. The sample data input field 504 can be configured to receive a string of text or a file. According to some examples, the template configuration client 106 causes presentation of the data input UI 502 on a display of the computer device 116 of the configuration user system 102.

Figure 5B:
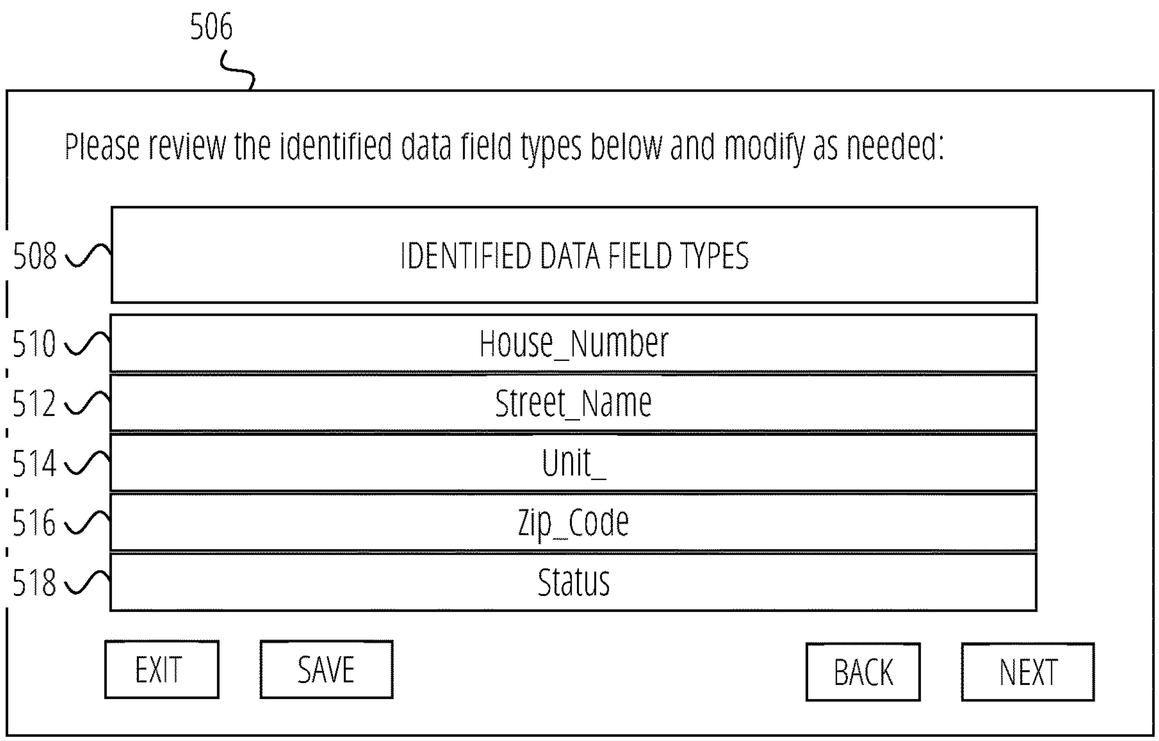
FIG. 5B illustrates an example identification review UI, according to some examples.

FIG. 5B illustrates an example identification review UI 506, according to some examples. The identification review UI 506 includes a plurality of identified data field types 508 that have been identified in the sample data provided to the data input UI 502 by the template configuration client 106. In the illustrative example, the identified data field types 508 include House_Number 510, Street_Name 512, Unit_514, Zip_Code 516, and Status 518. The identification review UI 506 can include additional identified data field types 508 and can include a scrollbar to enable to user to scroll to review additional identified data field types 508. According to some examples, the template configuration client 106 causes presentation of the identification review UI 506 on a display of the computer device 116 of the configuration user system 102.

Figure 5C:
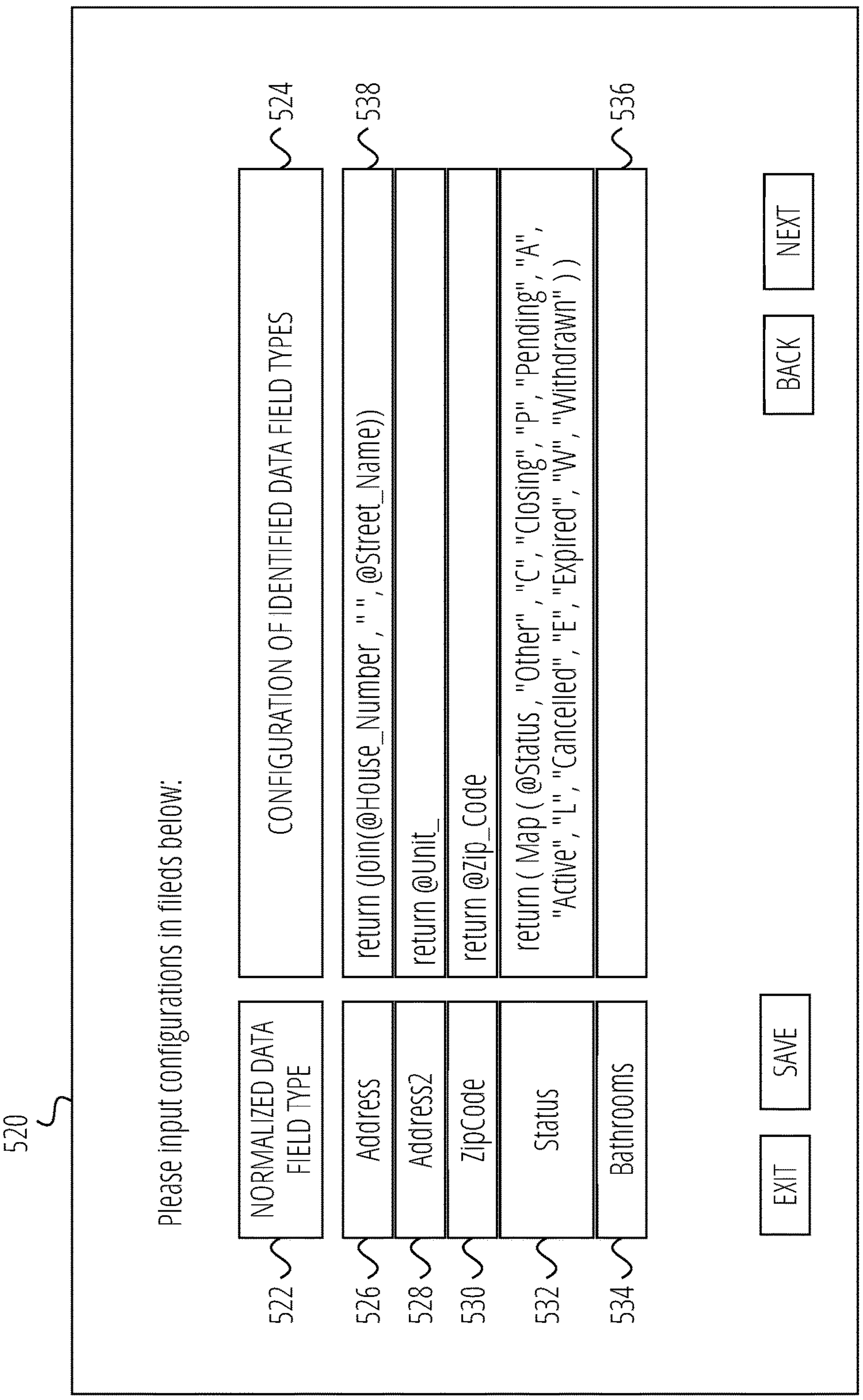
FIG. 5C illustrates an example configuration UI, according to some examples.

FIG. 5C illustrates an example configuration UI 520, according to some examples. The configuration UI 520 includes a customizable mapping between normalized data field types 522 and configurations of identified data field types 524. The identified data field types referenced in the configurations of identified data field types 524 are the identified data field types 508 reviewed by the user in the identification review UI 506 of FIG. 5B, according to some examples.

Similar to the example in FIG. 4, the normalized data field types 522 are another example based on publicly available real estate data. For example, the normalized data field types 522 include Address 526, Address2 528, ZipCode 530, Status 532, and Bathrooms 534. The configurations of identified data field types 524 convert the identified data field types 508 into the normalized data field types 522, according to some examples.

As depicted in FIG. 5C, the user has completed most of the configurations of identified data field types 524, with the exception of a blank Bathroom configuration 536. For example, the Address 526 data field type is configured from the sample data input by an Address configuration 538. The Address configuration includes the syntax "return (Join (@House_Number," ", @Street_Name))," where 'return' and 'Join' belong to the predefined configuration syntax. The syntax of statements such as 'Join,' can be changed, for example, to 'Concat,' or another term, by a designer of the custom scripting language. Similarly, @House_Number and @Street_Name reference House_Number 510 and Street_Name 512 respectively using the '@' syntax. Likewise, the '@' syntax followed by the name of an identified data field types 508 belongs to the predefined configuration syntax in this example. Other string variables, such as " ", belong to the predefined configuration syntax if they are composed of characters that are configurable in the custom scripting language, according to some examples.

In the illustrative example depicted in FIG. 5C, the predefined configuration syntax belongs to a custom scripting language. The custom scripting language resembles C#code but differs from it by including custom syntax. According to some examples, the interpretation system 206 maps the custom scripting language to C#. Additional examples of predefined configuration syntax include:

Return="return";
AcresToSqft="AcresToSqft";
Add="+";
AndCondition="& &";
ContainsAll="ContainsAll";
ContainsAny="ContainsAny";
Contains="Contains";
StartsWithMethod="StartsWith";
ContainsIgnoreCase="Contains?";
CodeBlock="{";
CloseCodeBlock="}";
CloseGroup=")";
Divide="/";
Multiple="*";
Subtract="–";
IsNot="IsNot";
If="if";
Group="(";
EndStatement=";";
OpenStatement="\r\n";
OpenStatement2="\n";
IsEqual="==";
IsNotEqual="!=";
IsNumber="IsNumber";
IsEqualIgnoreCase="=?";
IsGreaterThanOrEqual=">=";
IsGreaterThan=">";
IsLessThanOrEqual="<=";
IsLessThan="<";
OrCondition="||";
Remainder="%";
Select="Select";
Join="Join";
Count="Count";
Length="Length";
Filter="Filter";
FilterOut="FilterOut";
TrimMethod="Trim";
TrimStartMethod="TrimStart";
ToIntMethod="ToInt";
ToDecimalMethod="ToDecimal";
ToUpperMethod="ToUpper";
ToLowerMethod="ToLower";
RegexpReplaceMethod="RegexReplace";
ToStringMethod="ToString";

ToString FormatMethod="ToString Format";
UnicodeClean="UnicodeClean";
Sequence=",";
MemberAccess=".";
Assignment="="
Variable="@";
Map="Map";
SplitMethod="Split";
Splitter="Splitter";
Column="Column";
DoubleSplit="DoubleSplit";
AtIndex="At Index";
HtmlClean="HtmlClean";

According to some examples, the template configuration client 106 causes presentation of the configuration UI 520 on a display of the computer device 116 of the configuration user system 102.

The Bathrooms 534 data field type does not yet have a configuration in the configuration UI 520 of FIG. 5C. According to some examples, the user can select the blank Bathroom configuration 536 with an input device to generate a configuration UI popup 540 as depicted in FIG. 5D.

Figure 5D:
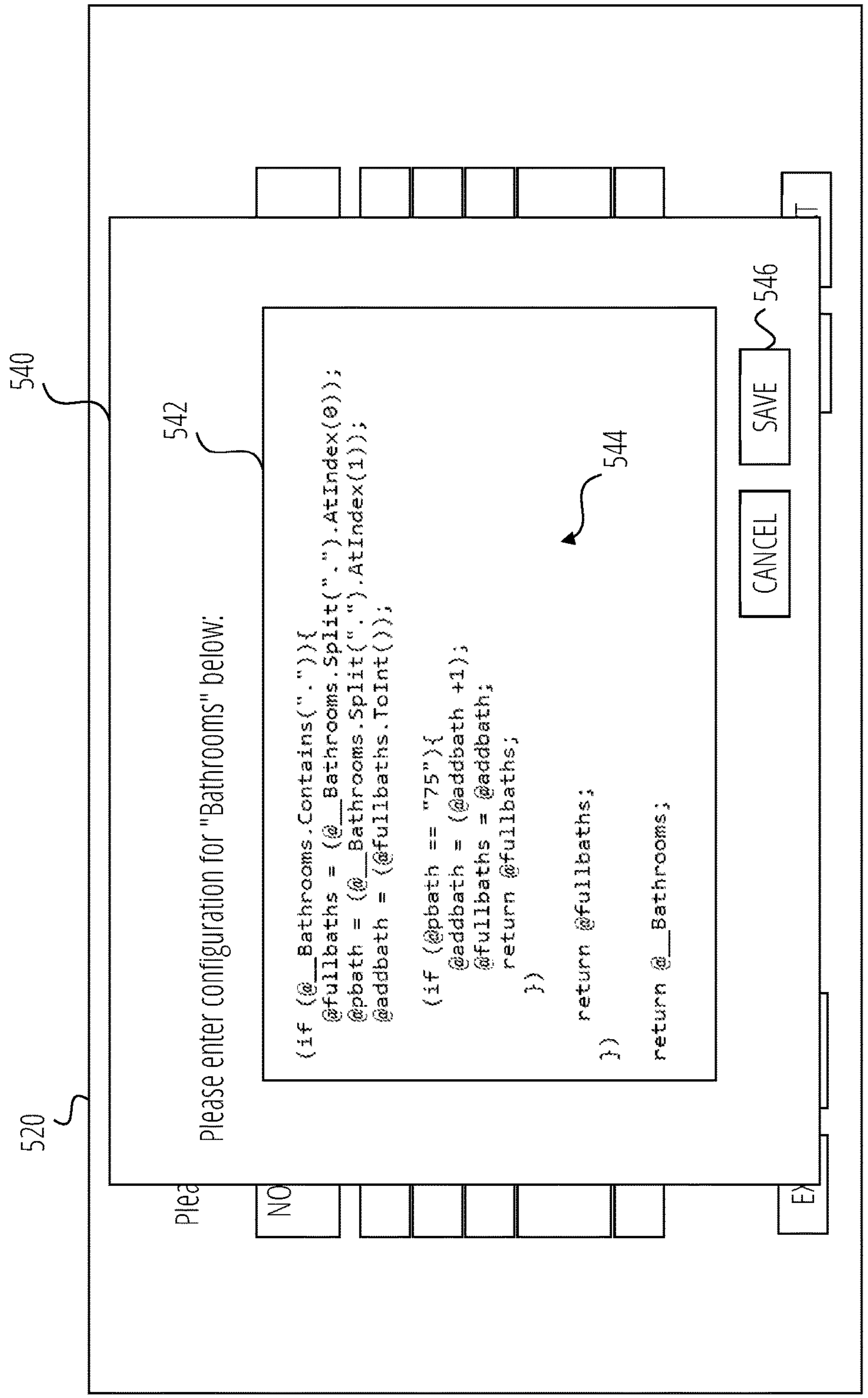
FIG. 5D illustrates an example configuration UI popup, according to some examples.

FIG. 5D illustrates an example configuration UI popup 540, according to some examples. According to some examples, the template configuration client 106 causes presentation of the configuration UI popup 540 as a layer overtop the configuration UI 520 on a display of the computer device 116 of the configuration user system 102.

The configuration UI popup 540 includes a configuration input field 542 configured to receive configuration input 544 from a user, such as the configuration input 216 of FIG. 2. The configuration input 544 includes a plurality of predefined configuration syntax that has been through the SDLC, such as "if" and "return," among other operations and variable calls. Accordingly, the block of scripting language within the configuration input 544 is free from security vulnerabilities.

Upon selecting a save button 546, the configuration UI popup 540 will close and the configuration UI 520 will include the configuration input 544 in the previously blank Bathroom configuration 536 field.

According to some examples, upon completing the blank Bathroom configuration 536, the custom mapping is complete since all normalized data field types 522 have associated valid configuration inputs 544. The complete custom mapping can be saved by the user as a template for future use by other users. The template includes the custom mapping, and the configurations thereof. Said other users can use the template (e.g., via the template execution client 118) to normalize other data of the same identified data field types 508.

Figure 6:
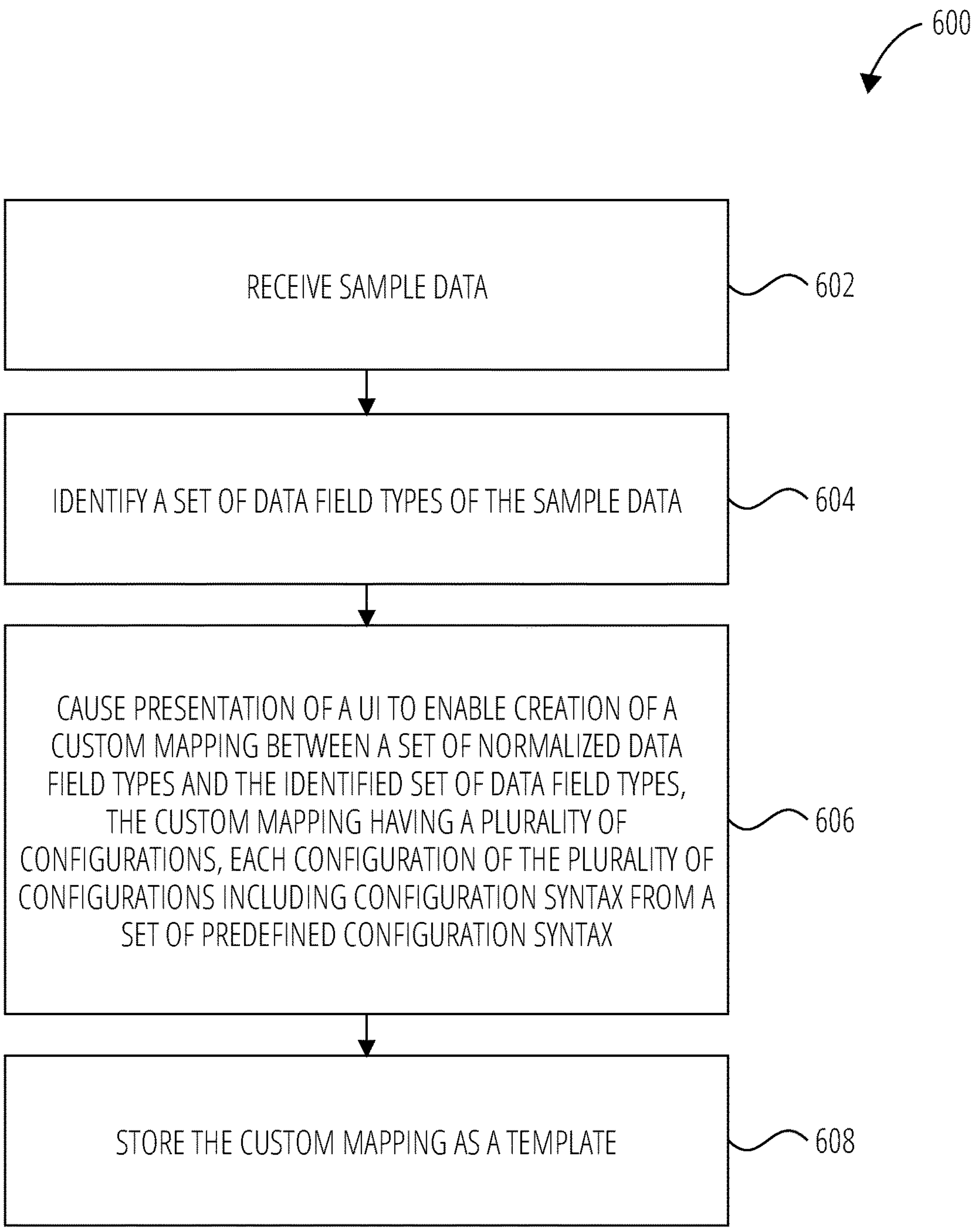
FIG. 6 illustrates a flowchart showing a technique for scalable on-demand data transformation, according to some examples.

FIG. 6 illustrates a flowchart showing a technique 600 for scalable on-demand data transformation accordance with some embodiments. In an example, operations of the technique 600 may be performed by processing circuitry, for example by executing instructions stored in memory. The processing circuitry may include a processor, a system on a chip, or other circuitry (e.g., wiring). For example, technique 600 may be performed by processing circuitry of a device (or one or more hardware or software components thereof), such as those illustrated and described with reference to FIG. 7.

The technique 600 includes an operation 602 to receive sample data. The sample data is data of a non-normalized format, such as sample data input 208 of FIG. 2. The sample data includes a plurality of data elements, where each data element of the plurality of data elements belongs to a data field type, according to some examples. According to some examples, a user of a first device provides the data via a user interface, such as the data input UI 502 of FIG. 5A. The user and the first device can be the configuration user system 102 of FIG. 1.

The technique 600 includes an operation 604 to identify a set of data field types of the sample data. The set of data field types are identified by a subsystem of a work engine, such as the template configuration client 106 of FIG. 1, or the interpretation system 206 of FIG. 2. According to some examples, the user of the first device can review the identified set of data field types, such as the identification review UI 506 of FIG. 5B.

The technique 600 includes an operation 606 to cause presentation of a UI to enable creation of a custom mapping between a set of normalized data field types and the identified set of data field types, the custom mapping having a plurality of configurations, each configuration of the plurality of configurations including configuration syntax from a set of predefined configuration syntax. The configuration syntax includes one or more data transformations of a data field type of the identified set of data field types to a normalized data type of the set of normalized data types, according to some examples. Each normalized data field type is associated with a respective configuration, according to some examples. Examples of the UI include the configuration UI 520 of FIG. 5C and the configuration UI popup 540 of FIG. 5D.

The technique 600 includes an operation 608 to store the custom mapping as a template. The template defines a workflow, according to some examples. The template can be stored on a server, such as the template server 126 or third-party servers 114 of FIG. 1. Additionally, or alternatively, the template can be stored in a database, such as database 130. Additionally, or alternatively, the template can be stored locally on a device, such as the local storage of the computer device 116 of the configuration user system 102.

The technique 600 may include additional operations of: receive a set of data and generate a set of normalized data by processing the set of data with the template, the normalized data including data of the set of normalized data field type. According to some examples, these additional operations may be performed by a second user, such as the user system 104 of FIG. 1. The second user can generate the set of normalized data via a template execution client 118 running on the user system 104, according to some examples.

Additionally, the processing of the set of data with the template may include further operations of generate a tokenized set of data using a custom lexer, parse the set of tokens into a data structure using a custom parser, and apply the data structure to the template to generate the set of normalized data. According to some examples, the custom parser configured to re-order the set of tokens into the data structure based on precedence in order of operations using Reverse Polish notation.

Figure 7:
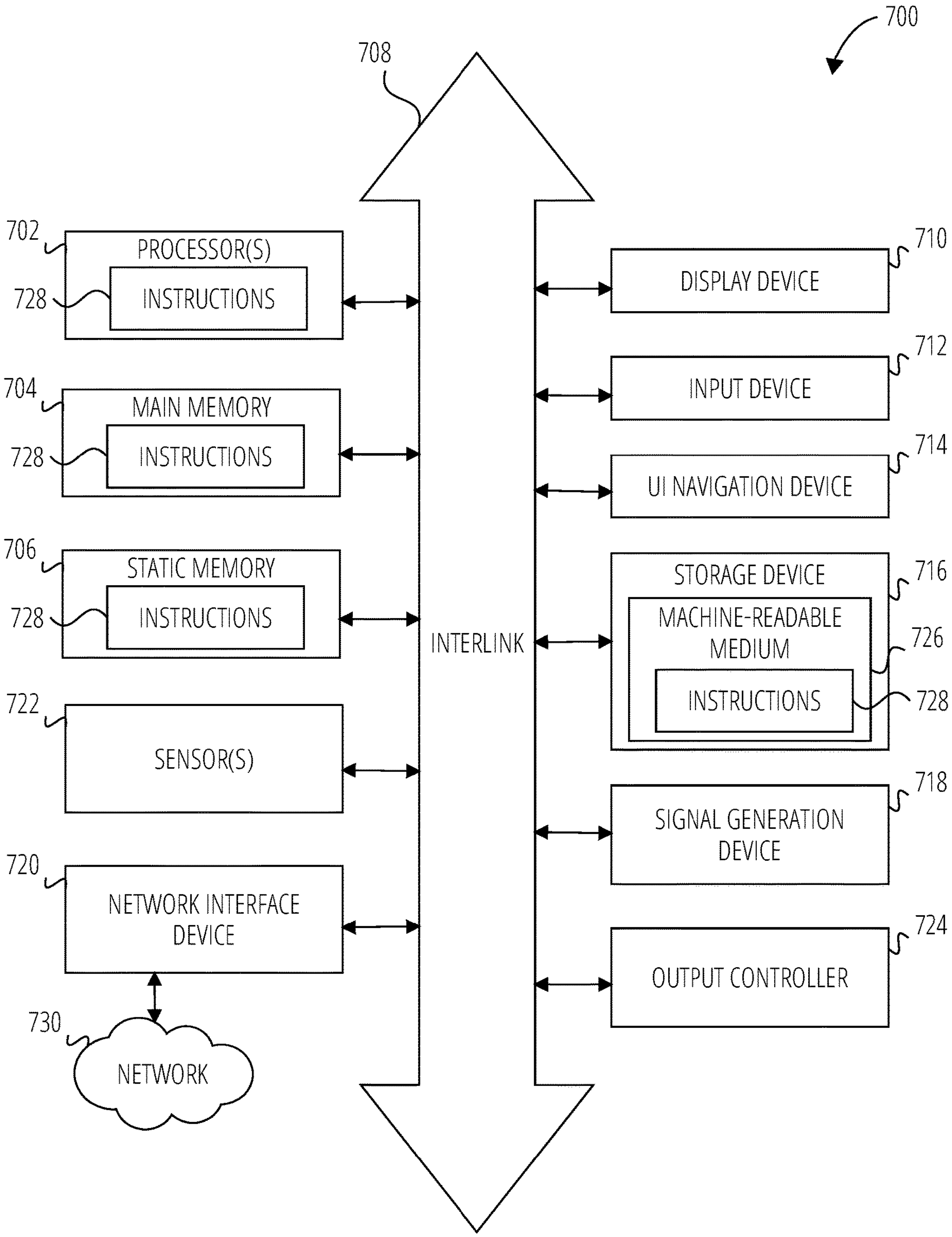
FIG. 7 illustrates generally an example of a block diagram of a machine upon which any one or more of the techniques discussed herein may perform in accordance with some examples.

FIG. 7 illustrates generally an example of a block diagram of a machine 700 upon which any one or more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor(s) 702 (e.g., a central processing unit (CPU), a graphics processing unit (GPU), a hardware processor core, or any combination thereof), a main memory 704 and a static memory 706, some or all of which may communicate with each other via an interlink 708 (e.g., a bus). The machine 700 may further include a display device 710, an alphanumeric input device 712 (e.g., a keyboard), and a UI navigation device 714 (e.g., a mouse). In an example, the display device 710, alphanumeric input device 712 and UI navigation device 714 may be a touch screen display. The machine 700 may additionally include a storage device 716 (e.g., drive unit), a signal generation device 718 (e.g., a speaker), a network interface device 720, and one or more sensor(s) 722, such as a global positioning system (GPS) sensor, compass, accelerometer, or other sensor. The machine 700 may include an output controller 724, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable machine-readable medium 726 that is non-transitory on which is stored one or more sets of data structures or instructions 728 (e.g., software) embodying or utilized by any one or more of the techniques or functions described herein. The instructions 728 may also reside, completely or at least partially, within the main memory 704, within static memory 706, or within the hardware processor(s) 702 during execution thereof by the machine 700. In an example, one or any combination of the hardware processor(s) 702, the main memory 704, the static memory 706, or the storage device 716 may constitute machine readable media.

While the machine readable machine-readable medium 726 is illustrated as a single medium, the term "machine readable medium" may include a single medium or multiple media (e.g., a centralized or distributed database, or associated caches and servers) configured to store the one or more instructions 728.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 728 may further be transmitted or received over a communications network 730 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 730. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The following, non-limiting examples, detail certain aspects of the present subject matter to solve the challenges and provide the benefits discussed herein, among others.

Example 1 is a method comprising receiving a sample data; identifying a set of data field types of the sample data; causing presentation of a user interface (UI) on a display of a first device to enable a user of the first device to input a custom mapping between a set of normalized data field type and the identified set of data field types, the custom mapping comprising a plurality of configurations, each configuration of the plurality of configurations includes configuration syntax from a set of predefined configuration syntax; and storing the custom mapping as a template.

Example 2 is the method of example 1, further comprising: receiving a set of data; and generating a set of normalized data by processing the set of data with the template, the normalized data including data of the set of normalized data field type.

Example 3 is the method of example 2, wherein processing the set of data with the template further comprises: generating a tokenized set of data using a lexer; parsing the set of tokens into a data structure using a parser, the parser configured to re-order the set of tokens into the data structure based on precedence in order of operations; and applying the data structure to the template to generate the set of normalized data.

Example 4 is the method of example 3, wherein the parser is further configured to re-order the set of tokens into the data structure based on precedence in order of operations using Reverse Polish notation.

Example 5 is the method of example 1, wherein the configuration syntax includes one or more data transformations of a data field type of the identified set of data field types to a normalized data type of the set of normalized data type.

Example 6 is the method of example 1, wherein causing presentation of the UI to enable the user of the first device to create the custom mapping further comprises: generating the UI, the UI comprising the set of normalized data field types and at least one input field; and receiving a first input from the first device, the first input being associated with a first normalized data field types of the set of normalized data field types, the first input comprising a first configuration syntax, the first configuration syntax including one or more data transformations of a first data field type of the identified set of data field types to the first normalized data field type.

Example 7 is the method of example 6, further comprising: receiving a second input from the first device, the second input being associated with a second normalized data field type of the set of normalized data field types, the second input comprising a second configuration syntax; identifying invalid syntax in the second configuration, the invalid syntax not comprised in the set of predefined configuration syntax; and rejecting the second input.

Example 8 is the method of example 1, wherein each of the configuration syntax belonging to the set of predefined configuration syntax have been through a systems development life cycle (SDLC), the SDLC for configuration syntax comprising: designing the configuration syntax in a secure environment; peer-reviewing the configuration syntax; testing the configuration syntax; scanning the configuration syntax for vulnerabilities and deploying the configuration syntax.

Example 9 is the method of example 8, wherein the set of predefined configuration syntax having been through the SDLC belongs to a custom scripting language.

Example 10 is at least one non-transitory computer-readable storage medium, the computer-readable storage medium including instructions that when executed by processing circuitry, cause the processing circuitry to: receive a sample data; identify a set of data field types of the sample data; cause presentation of a user interface (UI) on a display of a first device to enable a user of the first device to input a custom mapping between a set of normalized data field type and the identified set of data field types, the custom mapping comprising a plurality of configurations, each configuration of the plurality of configurations includes configuration syntax from a set of predefined configuration syntax; and store the custom mapping as a template.

Example 11 is the at least one non-transitory computer-readable storage medium of example 10, further cause the processing circuitry to: receive a set of data; and generate a set of normalized data by processing the set of data with the template, the normalized data including data of the set of normalized data field type.

Example 12 is the at least one non-transitory computer-readable storage medium of example 11, wherein processing the set of data with the template further cause the processing circuitry to: generate a tokenized set of data using a lexer; parse the set of tokens into a data structure using a parser, the parser configured to re-order the set of tokens into the data structure based on precedence in order of operations; and apply the data structure to the template to generate the set of normalized data.

Example 13 is the at least one non-transitory computer-readable storage medium of example 12, wherein the parser is further configured to re-order the set of tokens into the data structure based on precedence in order of operations using Reverse Polish notation.

Example 14 is the at least one non-transitory computer-readable storage medium of example 10, wherein the configuration syntax includes one or more data transformations of a data field type of the identified set of data field types to a normalized data type of the set of normalized data types.

Example 15 is the at least one non-transitory computer-readable storage medium of example 10, wherein the causing presentation of the UI to enable the user of the first device to create the custom mapping further cause the processing circuitry to: generate the UI, the UI comprising the set of normalized data field types and at least one input field; and receive a first input from the first device, the first input being associated with a first normalized data field types of the set of normalized data field types, the first input comprising a first configuration syntax, the first configuration syntax including one or more data transformations of a first data field type of the identified set of data field types to the first normalized data field type.

Example 16 is the at least one non-transitory computer-readable storage medium of example 15, wherein the causing presentation of the UI to enable the user of the first device to create the custom mapping further cause the processing circuitry to: receive a second input from the first device, the second input being associated with a second normalized data field type of the set of normalized data field types, the second input comprising a second configuration syntax; identify invalid syntax in the second configuration, the invalid syntax not comprised in the set of predefined configuration syntax; and reject the second input.

Example 17 is the at least one non-transitory computer-readable storage medium of example 10, wherein each of the configuration syntax belonging to the set of predefined configuration syntax have been through a systems development life cycle (SDLC), the SDLC for configuration syntax comprising: designing the configuration syntax in a secure environment; peer-reviewing the configuration syntax; testing the configuration syntax; scanning the configuration syntax for vulnerabilities; and deploying the configuration syntax.

Example 18 is the at least one non-transitory computer-readable storage medium of example 17, wherein the set of predefined configuration syntax having been through the SDLC belongs to a custom scripting language.

Example 19 is a method comprising: receiving a sample data; identifying a set of data field types of the sample data; causing presentation of a user interface (UI) on a display of a first device to enable a user of the first device to input a custom mapping between a set of normalized data field type and the identified set of data field types, the custom mapping comprising a plurality of configurations, each configuration of the plurality of configurations includes configuration syntax from a set of predefined configuration syntax; storing the custom mapping as a template; receiving a set of data; and generating a set of normalized data by processing the set of data with the template, the normalized data including data of the set of normalized data field type, the processing the set of data with the template comprising: generating a tokenized set of data using a lexer; parsing the set of tokens into a data structure using a parser, the parser configured to re-order the set of tokens into the data structure based on precedence in order of operations using Reverse Polish notation; and applying the data structure to the template to generate the set of normalized data.

Example 20 is the method of example 19, wherein the parser is further configured to re-order the set of tokens into the data structure based on precedence in order of operations using Reverse Polish notation.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:

receiving sample data;

identifying a set of data field types of the sample data;

causing presentation of a user interface (UI) on a display of a first device to enable a user of the first device to input a custom mapping between a set of normalized data field types and the identified set of data field types, the custom mapping comprising a plurality of configurations, each configuration of the plurality of configurations including a user-authored script including at least one configuration syntax element selected from a set of predefined configuration syntax elements defining a data transformation operation executable by an interpreter at runtime;

storing the custom mapping as a template;

receiving, from a second device, a set of data separate from the sample data;

generating a set of normalized data corresponding to the set of data by executing the template against the set of data using the interpreter; and outputting the set of normalized data.

2. The method of claim 1, wherein executing the template against the set of data further comprises:

generating a tokenized set of data using a lexer;

parsing the tokenized set of data into a data structure using a parser, the parser configured to re-order the tokenized set of data into the data structure based on precedence in order of operations; and applying the data structure to the template to generate the set of normalized data.

3. The method of claim 2, wherein the parser is further configured to re-order the tokenized set of data into the data structure based on precedence in order of operations using Reverse Polish notation.

4. The method of claim 1, wherein the at least one configuration syntax element includes one or more data transformations of a data field type of the identified set of data field types to a normalized data type of the set of normalized data field types.

5. The method of claim 1, wherein causing presentation of the UI to enable the user of the first device to create the custom mapping further comprises:

generating the UI, the UI comprising the set of normalized data field types and at least one input field; and receiving a first input from the first device, the first input being associated with a first normalized data field type of the set of normalized data field types, the first input comprising a first configuration syntax, the first configuration syntax including one or more data transformations of a first data field type of the identified set of data field types to the first normalized data field type.

6. The method of claim 5, further comprising:

receiving a second input from the first device, the second input being associated with a second normalized data field type of the set of normalized data field types, the second input comprising a second configuration syntax;

identifying an invalid syntax in the second configuration syntax, the invalid syntax not comprised in the set of predefined configuration syntax elements; and rejecting the second input.

7. The method of claim 1, wherein each configuration syntax belonging to the set of predefined configuration syntax elements has been through a systems development life cycle (SDLC), the SDLC comprising:

designing respective configuration syntax in a secure environment;

peer-reviewing the respective configuration syntax;

testing the respective configuration syntax;

scanning the respective configuration syntax for vulnerabilities; and deploying the respective configuration syntax.

8. The method of claim 7, wherein the set of predefined configuration syntax elements having been through the SDLC belongs to a custom scripting language.

9. The method of claim 1, wherein the interpreter is configured to execute only configuration syntax elements belonging to the set of predefined configuration syntax elements.

10. At least one non-transitory computer-readable storage medium, the computer-readable storage medium including instructions that when executed by processing circuitry, cause the processing circuitry to:

receive sample data;

identify a set of data field types of the sample data;

cause presentation of a user interface (UI) on a display of a first device to enable a user of the first device to input a custom mapping between a set of normalized data field types and the identified set of data field types, the custom mapping comprising a plurality of configurations, each configuration of the plurality of configurations including a user-authored script including at least one configuration syntax element selected from a set of predefined configuration syntax elements defining a data transformation operation executable by an interpreter at runtime;

store the custom mapping as a template;

receive, from a second device, a set of data separate from the sample data;

generate a set of normalized data corresponding to the set of data by executing the template against the set of data using the interpreter; and output the set of normalized data.

11. The at least one non-transitory computer-readable storage medium of claim 10, wherein executing the template against the set of data further cause the processing circuitry to:

generate a tokenized set of data using a lexer;

parse the tokenized set of data into a data structure using a parser, the parser configured to re-order the tokenized set of data into the data structure based on precedence in order of operations; and apply the data structure to the template to generate the set of normalized data.

12. The at least one non-transitory computer-readable storage medium of claim 11, wherein the parser is further configured to re-order the tokenized set of data into the data structure based on precedence in order of operations using Reverse Polish notation.

13. The at least one non-transitory computer-readable storage medium of claim 10, wherein the at least one configuration syntax element includes one or more data transformations of a data field type of the identified set of data field types to a normalized data type of the set of normalized data field types.

14. The at least one non-transitory computer-readable storage medium of claim 10, wherein the causing presentation of the UI to enable the user of the first device to create the custom mapping further cause the processing circuitry to:

generate the UI, the UI comprising the set of normalized data field types and at least one input field; and receive a first input from the first device, the first input being associated with a first normalized data field type of the set of normalized data field types, the first input comprising a first configuration syntax, the first configuration syntax including one or more data transformations of a first data field type of the identified set of data field types to the first normalized data field type.

15. The at least one non-transitory computer-readable storage medium of claim 14, wherein the causing presentation of the UI to enable the user of the first device to create the custom mapping further cause the processing circuitry to:

receive a second input from the first device, the second input being associated with a second normalized data field type of the set of normalized data field types, the second input comprising a second configuration syntax;

identify an invalid syntax in the second configuration syntax, the invalid syntax not comprised in the set of predefined configuration syntax elements; and reject the second input.

16. The at least one non-transitory computer-readable storage medium of claim 10, wherein each configuration syntax belonging to the set of predefined configuration syntax elements has been through a systems development life cycle (SDLC), the SDLC comprising:

designing respective configuration syntax in a secure environment;

peer-reviewing the respective configuration syntax;

testing the respective configuration syntax;

scanning the respective configuration syntax for vulnerabilities; and deploying the respective configuration syntax.

17. The at least one non-transitory computer-readable storage medium of claim 16, wherein the set of predefined configuration syntax elements having been through the SDLC belongs to a custom scripting language.

18. A system comprising:

processing circuitry; and a non-transitory machine-readable storage medium, the non-transitory machine-readable storage medium including instructions that when executed by the processing circuitry, cause the processing circuitry to:

receive sample data;

identify a set of data field types of the sample data;

cause presentation of a user interface (UI) on a display of a first device to enable a user of the first device to input a custom mapping between a set of normalized data field types and the identified set of data field types, the custom mapping comprising a plurality of configurations, each configuration of the plurality of configurations including a user-authored script including at least one configuration syntax element selected from a set of predefined configuration syntax elements defining a data transformation operation executable by an interpreter at runtime;

store the custom mapping as a template;

receive, from a second device, a set of data separate from the sample data;

generate a set of normalized data corresponding to the set of data by executing the template against the set of data using the interpreter; and output the set of normalized data.

* * * * *